UNITED STATES PATENT OFFICE.

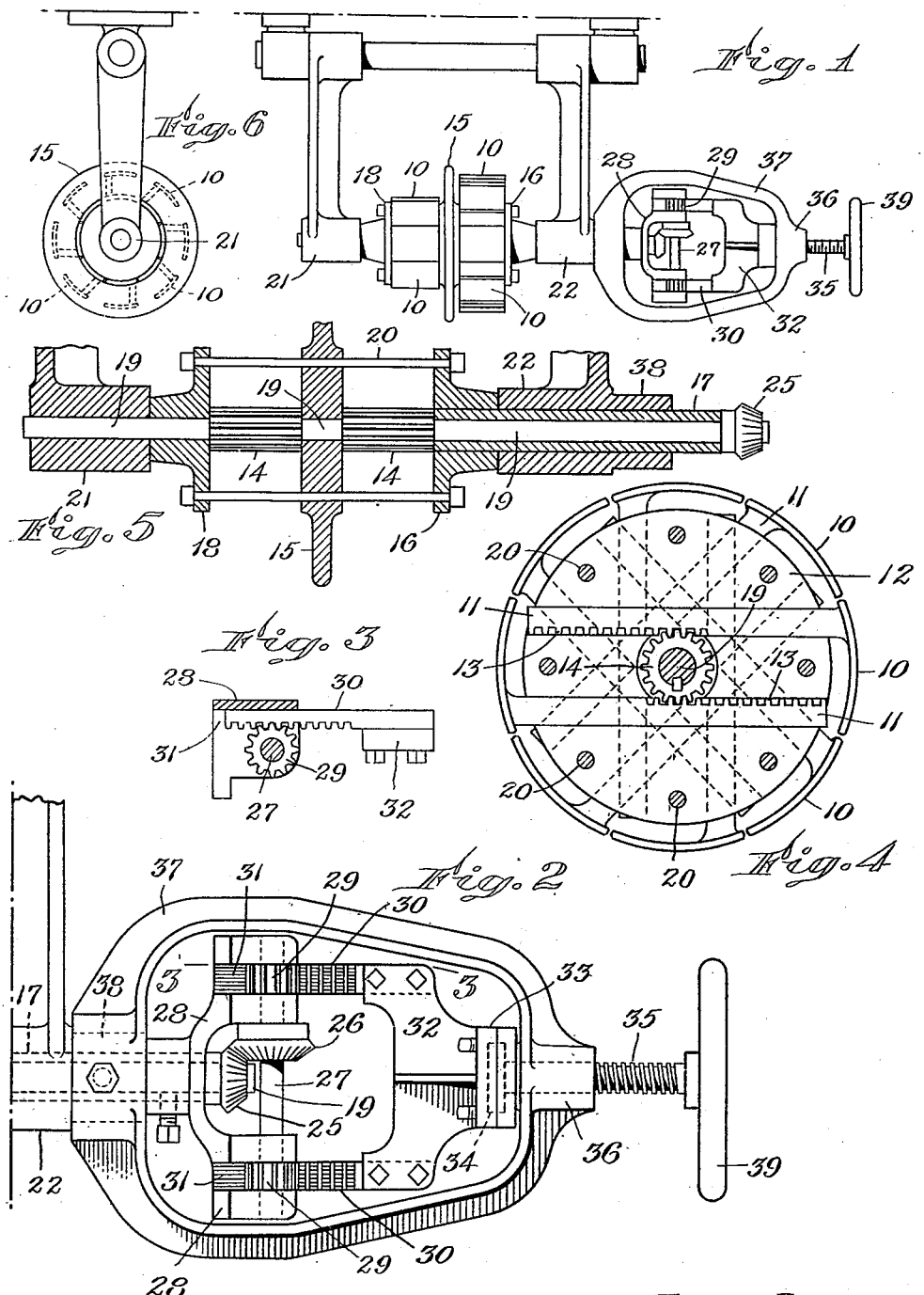

LEON W. CAMPBELL, OF WOONSOCKET, RHODE ISLAND, ASSIGNOR TO THE STANDARD ENGINEERING WORKS, OF WOONSOCKET, RHODE ISLAND, A CORPORATION OF RHODE ISLAND.

EXPANSION-PULLEY.

1,119,746.      Specification of Letters Patent.      Patented Dec. 1, 1914.

Application filed May 2, 1913. Serial No. 765,117.

*To all whom it may concern:*

Be it known that I, LEON W. CAMPBELL, a citizen of the United States, and resident of Woonsocket, in the county of Providence and State of Rhode Island, have invented certain new and useful Improvements in Expansion-Pulleys, of which the following is a specification.

This invention relates to means for expanding and contracting expansible pulleys.

The invention is embodied in mechanism especially adapted for use with the expansion pulleys shown in Letters Patent of the United States 890,879, granted June 16, 1908, to Scriven and Smith.

Of the accompanying drawings: Figure 1 represents an elevation of pulley mechanism provided with adjusting mechanism embodying the present invention. Fig. 2 represents an elevation, on a larger scale, of the adjusting mechanism included in Fig. 1. Fig. 3 represents a section through the adjusting mechanism in the plane indicated by line 3—3 of Fig. 2. Fig. 4 represents a cross section of one of the expansible pulleys. Fig. 5 represents a longitudinal section of portions of the pulley mechanism and adjusting mechanism. Fig. 6 represents an end elevation of the pulley mechanism.

The same reference characters indicate the same parts wherever they occur.

In accordance with the structure set forth in the aforesaid Patent 890,879, the pulley mechanism comprises belt-engaging segments 10 and means for moving them radially toward and from the axis of rotation to vary the effective diameter of the pulley. Each of these segments is provided with a spoke 11. The spokes are tangential and are arranged to slide lengthwise in suitable grooves formed in bearing disks such as that indicated at 12. Each spoke is provided with teeth 13 which engage the teeth of a pinion 14. The spokes are arranged in pairs whereby those of two diametrically opposite segments 10 stand in the same plane, but the spokes of one pair are not in the same plane as the spokes of any other pair. The face of the pinion 14 is of such width that the teeth of all the spokes of one pulley engage the one pinion, but the several points of engagement with the pinion are at different circumferential points of the pinion. Referring to Fig. 4, rotation of the pinion to the right relative to the disks 12 causes outward radial movement of the segments 10, and relative rotation to the left causes inward movement of the segments. The present invention concerns the means for imparting such relative rotation to the pinion 14, the structure of the pulley itself being well known and forming no part of this invention.

As shown by Fig. 1, there are two pulleys side by side, the pulley at the right being expanded to its maximum diameter, and that at the left being contracted to its minimum diameter. This duplex arrangement permits simultaneous inverse adjustment of the two pulleys by one shaft extending through them as further description will show. The two pulleys, that is to say, the two series of belt-engaging segments 10, are separated by a disk 15. The disk indicated at 16 is affixed to a hollow shaft or sleeve 17. The disk indicated at 18 is loosely mounted upon a shaft 19. Rods 20 extend through the disks 15, 16 and 18 and likewise through the disks 12 which furnish the bearings for the spokes 11. The rods 20 tie the disks rigidly with relation to each other, and the disks are therefore, to all intents and purposes, a unit so far as their rotation is concerned. The left end of the shaft 19 is mounted in a bearing 21, and the sleeve or hollow shaft 17 is mounted in a bearing 22.

The diameter of the pulleys is varied, as previously stated, by relative rotation of the pinions 14 and the disks. The pinions are mounted upon the shaft 19 and are keyed or otherwise affixed thereto. Inasmuch as the disks are all rigid with relation to the sleeve 17, and the pinions are affixed with relation to the shaft 19, it is apparent that relative rotation of the sleeve and shaft will vary the effective diameters of the pulleys. A bevel gear 25 is affixed to the right-hand end of the shaft 19. This gear engages a bevel gear 26 affixed to a transverse shaft 27. The ends of the shaft 27 are mounted in suitable bearings afforded by a member 28. This member is affixed to the sleeve 17, from which it is evident that it rotates in unison with the pulleys. The shaft 27 is provided with pinions 29 which are diametrically opposite with relation to the axis of the shaft 19. These pinions are engaged respectively by the teeth of rack-bars 30. The rack-bars are adapted to slide in suitable grooves 31 formed in the member 28, and they are held in coöperative engagement with the pinions by the member 28 and they partake of the rotary movement of the pulleys. The rack-bars are affixed to a yoke 32. This yoke is provided with a suitable housing 33 for the reception of a head 34. This head is carried by a screw-shaft 35, the head and housing providing a swivel connection between the screw-shaft and the continuously rotating elements.

The shaft 27 is rotated relatively to its bearings by longitudinal movement of the rack-bars, and such movement of the rack-bars may be caused by operating the screw-shaft 35. This screw-shaft has screw-threaded connection with a bearing 36, the latter being internally threaded. This bearing is a part of a stationary frame 37. The opposite end of the frame is mounted upon and affixed to an extension 38 of the main bearing 22. The screw-shaft is provided with a wheel 39 by which it may be operated. When the pulleys are rotating, all the elements of the adjusting mechanism, with the exception of the frame 37 and screw-shaft 35, partake of such rotation. The rotary movement of the adjusting elements is not affected in any way by longitudinal movement of the rack-bars 30, the latter being capable of moving longitudinally while rotating. When the screw-shaft is turned, it turns the shaft 19 relatively to the sleeve 17 and thus varies the effective diameters of the pulleys. The longitudinal stress which occurs during such adjusting operation is sustained entirely by the frame 37, and there is no stress which would spring the main bearings 21 and 22 toward or from each other. The adjusting mechanism set forth in the aforesaid Patent 890,879, does spring the main bearings as stated, because the inner shaft in that patent, which corresponds to the shaft 19 in the present instance, is movable longitudinally and has spiral tongue-and-groove connection with the pinion within the pulley. It has been found in practice that the adjusting mechanism in said patent causes the bearings to bind and sometimes breaks the hangers which support them. These objections are entirely avoided by the present invention, because the longitudinal stress in both directions is sustained by the frame 37. Another advantage of the present improvement is that it does not require so much power for varying the diameter of the pulley or pulleys, as the case may be. Still another advantage is that it dispenses with the spiral tongue-and-groove connection between the shaft and pinion within the pulleys, and provides more serviceable means for the purpose. A plurality of pulleys, arranged side by side, may be operated by one shaft extending through them; but this arrangement is not possible according to the mechanism in said patent.

While I have shown the pinions 29 and rack-bars 30 in duplicate, it is to be understood that one of these couples is sufficient for effecting the desired adjustment of the pulleys. One reason for duplicating the rack and pinion is to equalize the stress of the moving parts so that the adjusting movement will be transmitted with the least effort and with the least binding of the parts. The duplicated members are so arranged with reference to the axis of the shaft 19 that the parts counterbalance each other. It will be readily understood, however, that one rack and pinion could be counterbalanced otherwise than by providing a duplicate rack and pinion. The pulleys as shown are arranged to take separate belts and transmit motion from one to the other. When the diameters of the pulleys are changed, the pulleys are shifted transversely of their axis. The bearings 21 and 22 are therefore mounted to take care of such shifting, being suspended by a swinging frame comprising arms 40, 40 and a rockshaft 41 rigidly connecting said arms. The rockshaft is mounted in bearings 42, 42, and the swinging frame automatically adjusts itself as to position and equalizes the tension of the two belts.

I claim:

1. In an expansion pulley, a sleeve affixed thereto in coaxial relation, a shaft extending through said sleeve and rotatable relatively thereto, means operable by relative rotation of said shaft and sleeve for varying the effective diameter of the pulley, means arranged to couple said shaft and sleeve to cause them to turn in unison, said coupling means including relatively adjustable members arranged to turn said shaft relatively to said sleeve, and means including a normally stationary operating member for adjusting said members to change the diameter of the pulley.

2. In an expansion pulley, a sleeve affixed thereto in coaxial relation, a bearing for said sleeve, a shaft extending through said sleeve and rotatable relatively thereto, means operable by relative rotation of said shaft and sleeve for varying the effective diameter of the pulley, means arranged to couple said shaft and sleeve to cause them to turn in unison, said coupling means including gears arranged to cause relative rotary movement between said shaft and sleeve, a thrust-sustaining member affixed to said bearing, a screw carried by said member, and means operable by endwise movement of said screw for causing relative turning of said gears to change the diameter of the pulley.

In testimony whereof I have affixed my signature, in presence of two witnesses.

LEON W. CAMPBELL.

Witnesses:
WALTER P. ABELL,
P. W. PEZZETTI.

Copies of this patent may be obtained for five cents each, by addressing the "Commissioner of Patents, Washington, D. C."